(No Model.)

C. CORNELIUS.
WASH BOARD.

No. 440,101. Patented Nov. 4, 1890.

Witnesses:
Harry S. Rohrer.
Will S. Norton

Inventor:
C. Cornelius
by Wiles & Greene
Attorneys.

UNITED STATES PATENT OFFICE.

CHARLES CORNELIUS, OF NEILLSVILLE, WISCONSIN, ASSIGNOR TO GEO. F. McCULLOCH.

WASH-BOARD.

SPECIFICATION forming part of Letters Patent No. 440,101, dated November 4, 1890.

Application filed July 19, 1889. Serial No. 318,014. (No model.)

*To all whom it may concern:*

Be it known that I, CHARLES CORNELIUS, a resident of Neillsville, in the county of Clark and State of Wisconsin, have invented certain new and useful Improvements in Wash-Boards; and I do hereby declare the following to be a full, clear, and exact description of the invention, such as will enable others skilled in the art to which it pertains to make and use the same.

My invention relates to improvements in wash-boards of the class in which the central or rubbing plate is of glass or the like. It is fully illustrated in the accompanying drawings, in which—

Figure 1:
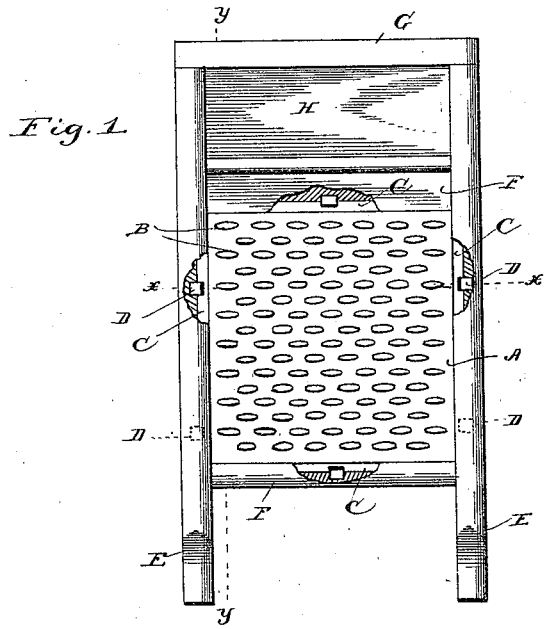
Figure 2:
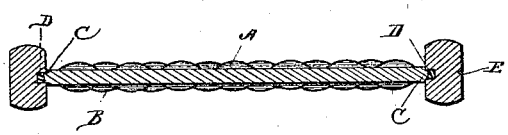
Figure 4:
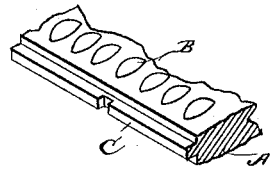
Figure 3:
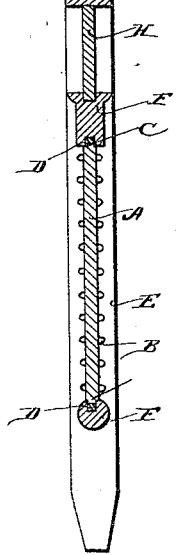

Figure 1 is a side view of the board, certain parts being broken away to show construction. Fig. 2 is a section on the line $x\,x$, Fig. 1. Fig. 3 is a section on the line $y\,y$, Fig. 1. Fig. 4 is a partial perspective view showing one of the notches in the edge of the board.

In the drawings, A is a plate of glass having upon its two surfaces ovoid protuberances B, arranged in parallel lines, each protuberance standing opposite the space between consecutive protuberances in the adjacent lines. The plate is provided with a tongue C at each of its four edges, and each of the tongues has one or more notch-like recesses, in which fit small bits of rubber D, that project slightly beyond the glass at the edge and on both sides of the tongue. The glass thus provided with rubber guards is placed in a frame composed of stiles E and rails F, all grooved to receive the tongues upon the glass-plate. The grooves are slightly wider than the thickness of the tongues, and their depth is a little greater than the tongues' projection, so that when the plate is in position the glass is nowhere in contact with the frame, but is supported entirely by the rubber. It follows that the glass is much less likely to be broken by warping of the frame by use or by accidental blows received in shipment or otherwise. Should it nevertheless be broken, it may be replaced by taking off the cap G and lifting out of place the board H and the upper rail F, both of which slide in the gooves in the stiles. It is not necessary to remove the lower rail, which is permanently secured to the stiles, for the recesses in the glass retain the rubber in position while the plate slides downward in the stile-grooves. When the plate has been pushed down into position, the upper rail, board, and cap are replaced and the wash-board is ready for use. The upper rail is flanged out to the full width of the stile at its upper edge to form upon each side of the board a broad ledge upon which soap may rest.

What I claim as new, and desire to secure by Letters Patent, is—

The combination, with the glass plate recessed or notched at its edges, of the pieces of rubber placed in said recesses and projecting beyond the surfaces of the glass, and the frame grooved to receive the rubber-protected edges of said plate, substantially as and for the purpose set forth.

In testimony whereof I have signed this specification in the presence of two subscribing witnesses.

CHARLES CORNELIUS.

Witnesses:
 H. SCHILDHAUER,
 PHILIP BERG.